2 Sheets—Sheet 1.

W. P. WILLIAMSON.
Cooling and Ventilating Cars.

No. 221,988. Patented Nov. 25, 1879.

Fig. I.

Attest:
C. Clarence Poole
Warren Seely

Inventor:
William P. Williamson
by Ellis Spear
Atty

2 Sheets—Sheet 2.

W. P. WILLIAMSON.
Cooling and Ventilating Cars.

No. 221,988. Patented Nov. 25, 1879.

Attest:
C. Clarence Poole
Warren Seely

Inventor:
William P. Williamson,
by Ellis Spear
Atty

UNITED STATES PATENT OFFICE.

WILLIAM P. WILLIAMSON, OF QUINCY, ILLINOIS.

IMPROVEMENT IN COOLING AND VENTILATING CARS.

Specification forming part of Letters Patent No. 221,988, dated November 25, 1879; application filed August 25, 1879.

*To all whom it may concern:*

Be it known that I, WILLIAM P. WILLIAMSON, of Quincy, Adams county, Illinois, have invented an Improvement in Apparatus for Cooling and Ventilating Cars, of which the following is a specification.

My invention relates to car-ventilators, and has for its object the cooling and purification of air which is admitted to the interior of the car.

It consists, essentially, of a water-tank with a hooded pipe for the admission of air to said tank, in combination with certain deflecting-surfaces of cloth or equivalent material and spraying-pipes, whereby the air is cleansed, moistened, and cooled by its passage over water and wet surfaces.

In connection with this apparatus are shown pipes which conduct the air to different parts of the car, all as hereinafter more fully described.

Figure 1:
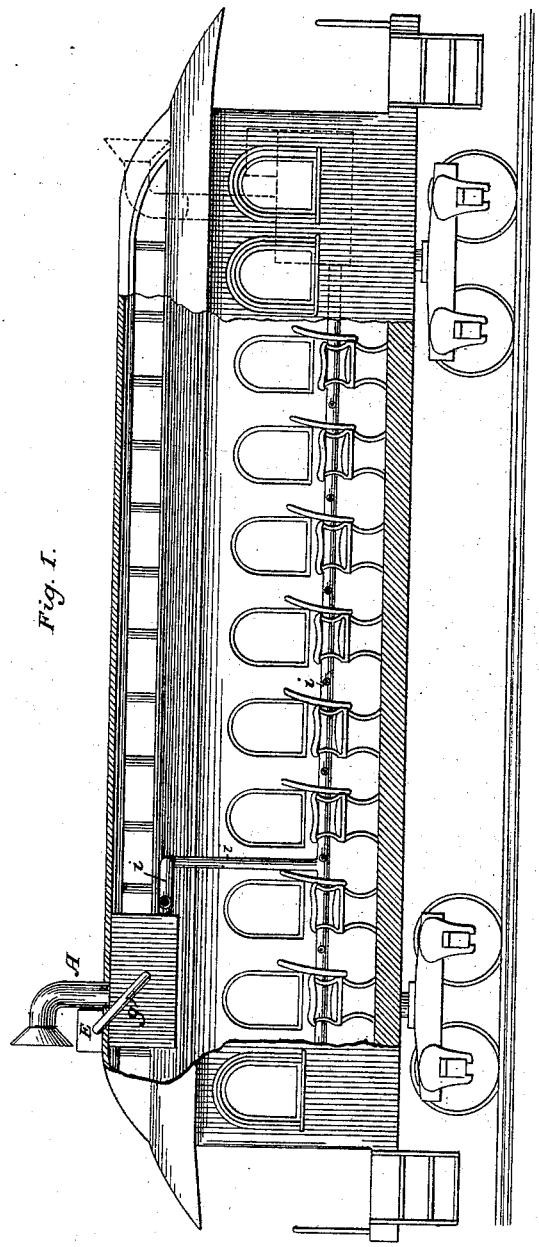
Figure 2:
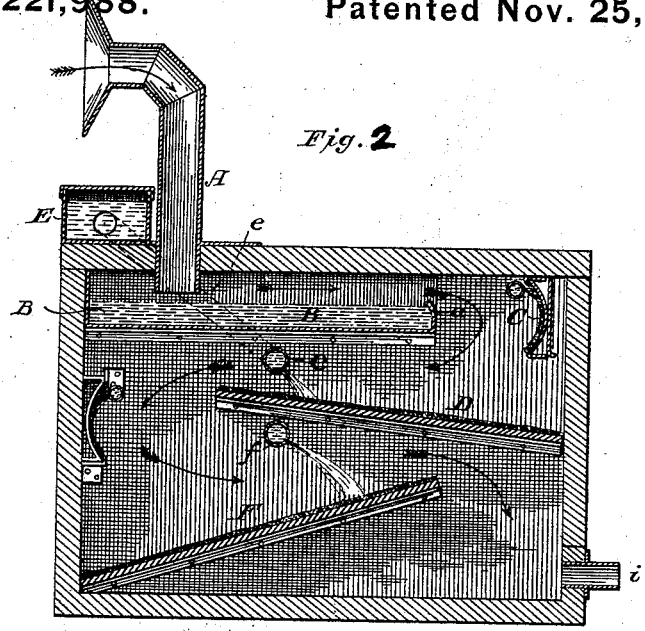
Figure 3:
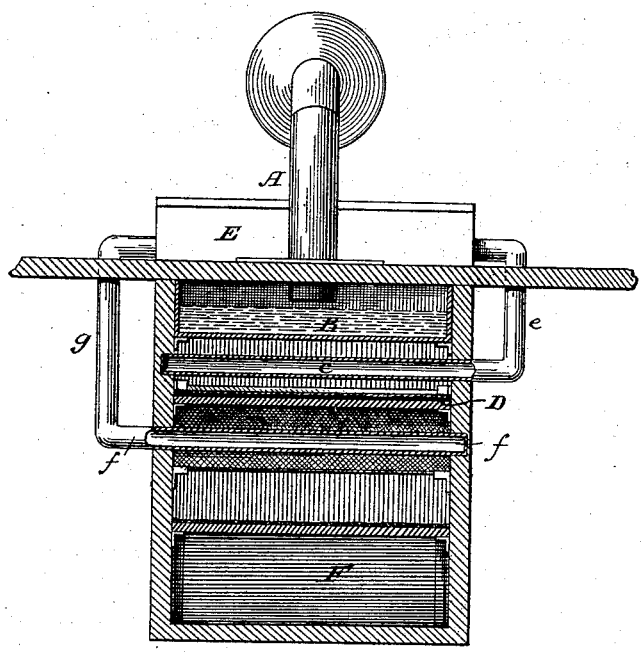

In the drawings, Figure 1 represents a side elevation of a car with my ventilator attached, and with pipes conducting cleansed and cooled air to differents parts of the car, certain parts of the side of the car being represented as broken away to exhibit the interior structure. Fig. 2 represents a longitudinal vertical section of the air cleansing and cooling device. Fig. 3 represents a transverse vertical section taken through the spraying-pipes.

Heretofore various kinds of apparatus have been devised for eliminating the dust and cinders from the air which is admitted to railway-cars, in some of which the air is impelled against the surface of water, or through the body of water, and then distributed through the interior of the car.

In my apparatus I employ a shallow tank of water, which receives the air on its first entrance into the apparatus, the air being directed against the surface of the water, by means of which all the heavier cinders and larger part of the dust and smoke are removed from the air and absorbed in the water. The air, however, after impinging against the surface of the water, is deflected against a surface of cloth, felt, or other material capable of absorbing water and kept wet, and thence the air is deflected to other similar surfaces. In its passage over these moistened surfaces it causes a rapid evaporation of the water contained within, by means of which it is cooled. Further, by its forcible contact with the wet surface of cloth or equivalent material it loses whatever of smoke or fine dust may have been retained after the passage over the water.

In the drawings, A represents an ordinary ventilating-pipe, with its hood capable of being turned toward the forward end of the car. This pipe passes through the roof of the car and terminates centrally over a tank of suitable size, ordinarily of three or four feet, (represented in the drawings at B.) This tank is made shallow, as represented, and is adapted to hold a suitable quantity of water for the purpose intended. An inclined partition, *a*, is placed at the rear end, to prevent the water from dashing over during the motion of the car or when going on an up grade. The end of the pipe A is brought down near to the surface of the water, but is not intended to be in contact therewith.

In rear of the tank B is a deflector, C. This is made preferably of a curved shape, as shown in Fig. 2. It may be made of tin or other sheet metal, or of wood, and is covered upon its face with thick cloth or felt, or some equivalent material. A pipe may be located near this deflector, extending across from side to side, and preferably a little above, for the purpose of spraying water upon it and keeping the surface moist. This curved deflector is adapted to turn the air downward and cause it to strike upon a second inclined deflector, D, which is also made with a cloth or felt surface adapted to be saturated with water. Over this deflector, near its upper end, is a spray-pipe, *c*, extending across from side to side, and connected by a pipe, *e*, with the water-tank E, situated on top of the car. The air passing over this first deflector is turned downward against a second inclined deflector, F, which, like the first, is covered with cloth or felt, and is provided with a spray-pipe, *f*, similar to that before described, and connected by means of a pipe, *g*, with the tank E. The perforations in these pipes are only sufficient to permit a slow percolation of the water, in order to keep the evaporating-surfaces moist. Over this last deflector the current of air is impelled to the rear of the box, whence it is conducted by pipes *i i*, which may pass within the walls of the car beneath the casing, and have short egress-pipes, if desired, at each seat, with a stop-cock, by means of which a current of air may be allowed to flow out for each passenger.

The hood on the pipe A should be large enough to give an abundant supply of air. Manifestly the air, driven with great force by the rapid motion of the car, will be impelled into the interior of the car and must find some egress. For this purpose I propose to provide exhaust pipes or valves, either in the bottom, end, or top of the car, for the escape of the foul air; or arrangements may be made to permit it to escape through the closets, thus at the same time ventilating them.

I do not confine myself to the particular form or arrangement of the evaporating-surfaces. It is only necessary that the air should be compelled to pass over them, and that they should be kept properly moistened.

I do not limit myself to the number of deflecting and evaporating surfaces, and it is obvious that the size of the apparatus may be varied to meet the requirements of different situations and different sizes of cars. The pipes *i i*, it is obvious, also, may be located in any convenient part of the car. I prefer to carry them along the side of the car about three feet from the floor.

Although I have shown the air cooling and cleansing device at the top of the car, I may prefer to locate it, as shown in dotted lines in Fig. 1, near the floor, on a level with the pipes which conduct the air to the car. If desirable, one may be located on each side of the passage.

Having thus described my invention, what I claim, and desire to secure by Letters Patent of the United States, is—

1. A device for ventilating and cooling cars, consisting of an air-admitting pipe, a tank, B, and a deflector, C, located in the rear of the tank B, and of an inclined deflector beneath the tank, the deflectors having surfaces of cloth or equivalent material, and being provided with spraying-pipes, the parts being combined and operating all as and for the purposes set forth.

2. The combination of the pipe A, the tank B, and the deflectors C, D, and F, as set forth.

3. In combination with the evaporating-surfaces of the deflectors, the spray-pipes and their water-supplying connections, as set forth.

In testimony whereof I have signed my name to this specification in the presence of two subscribing witnesses.

WILLIAM P. WILLIAMSON.

Witnesses:
C. CLARENCE POOLE,
R. F. BARNES.